Oct. 2, 1945.  E. A. ROCKWELL  2,385,942
TRAVEL CONTROL VALVE SYSTEM
Filed June 13, 1941    3 Sheets-Sheet 1

INVENTOR
Edward A. Rockwell
BY Arthur Wright
ATTORNEY

Oct. 2, 1945.  E. A. ROCKWELL  2,385,942

TRAVEL CONTROL VALVE SYSTEM

Filed June 13, 1941  3 Sheets-Sheet 2

Fig. 3.

INVENTOR
Edward A. Rockwell
BY
Arthur Wright
ATTORNEY

Patented Oct. 2, 1945

2,385,942

UNITED STATES PATENT OFFICE 2,385,942

TRAVEL CONTROL VALVE SYSTEM

Edward A. Rockwell, West Hartford, Conn.

Application June 13, 1941, Serial No. 397,897

23 Claims. (Cl. 121—41)

My invention relates particularly to an apparatus designed to obtain accurate travel control for controlling the movement of any desired device or mechanism and by means of modulated pressures applied thereto.

The object of my invention is to provide an apparatus in which accurate travel control of any device to be moved can be obtained, as for example in the controlling of steering gears, locomotive reverse gears or valve cut-offs, or for any other desired purpose. The apparatus made in accordance with my invention is adapted to apply any desired modulated pressure at any point of travel and so that the movable controlling element will have its extent of travel coordinated to the extent of travel of the part to be moved. This is accomplished partly by means of a monitor device, the principles of which are disclosed in my copending application upon Hydraulic travel modulation control, Ser. No. 369,003, filed December 7, 1940, and issued as Patent No. 2,352,344 on June 27, 1944. One of the objects of my invention is to obtain this action by exerting a positive force for moving the part forwardly as well as rearwardly to the extent desired. A further object is to accomplish the control above referred to by means of a single valve and by means of a mechanism enabling a more positive control of the position and movement of the part being moved to be obtained. Further details of my invention will appear from the detailed description of the same hereinafter.

While my invention is capable of embodiment in many different forms, by way of illustration I have shown only one form thereof in the accompanying drawings in which—

Referring to the drawings, I have shown a monitor device 1 comprising a servo device cylinder 2 having a head 3 provided with an inlet port 4 connected to a flexible pipe 5 adapted to receive modulated amounts of a hydraulic fluid of any desired character. The head 3 has passing through the same a shouldered stationary plunger 6, the outer end of which is screw-threaded to receive an eye-member 7 for the purpose of providing the monitor device with a fixed pivot by attachment of the same to any desired fixed base. A gasket 8 on the fixed plunger 6 provides a fluid-tight joint between the plunger 6 and the head 3. Around the plunger 6 there is located a hollow piston 9 which has a fluid-tight contact with the interior of the cylinder 2 owing to U-shaped rubber seals 10 and 11 held in place by a screw-threaded piston head 12 on the piston 9. The said head 12 thus provides a chamber 13 for the modulated liquid pressures in the cylinder 2 to the left of said head. To the right of the head of the piston 9 there is furthermore provided an annular chamber 14 for high pressure hydraulic liquid owing to a hollow piston rod 15 forming a part of the piston 9. The hollow piston rod 15 has an external diameter of a size such as to provide on the right face of the piston 9 an annular area 16 which is substantially one half the area 17 of the left face of the annular head 12. It is important to make the area 16 smaller than the area 17 but not necessarily of the relative dimensions above referred to. The cylinder 2, at its right-hand end, has a head 18 provided with a port 19 for connection to a flexible high pressure liquid supply pipe 20. A liquid-tight seal is provided in the head 18 by means of an annular rubber seal 21 held in place by an annular screw-threaded plug 22. Within the piston rod 15 there is a chamber 23, the right-hand end of which has a port 24 for communication with a flexible pipe 25 for receiving hydraulic liquid in amounts which coordinate the travel of the piston rod 15 to the manual controlling device hereinafter described. The right-hand end of the piston rod 15 has an eye-member 26 for connecting the same to any desired part of any kind of apparatus desired to be moved by the said cylinder.

Figure 4:
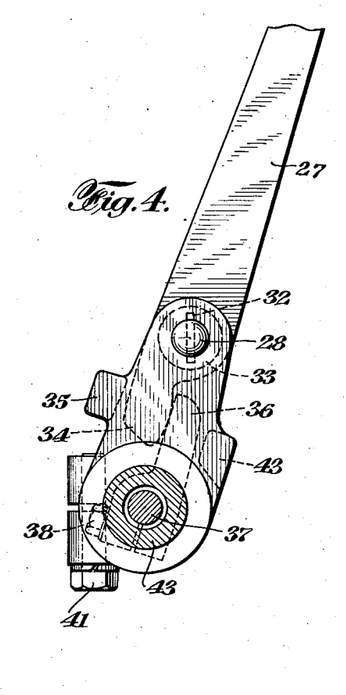
Fig. 4 is a transverse vertical section taken on line 4—4 of Fig. 2.
Figure 5:
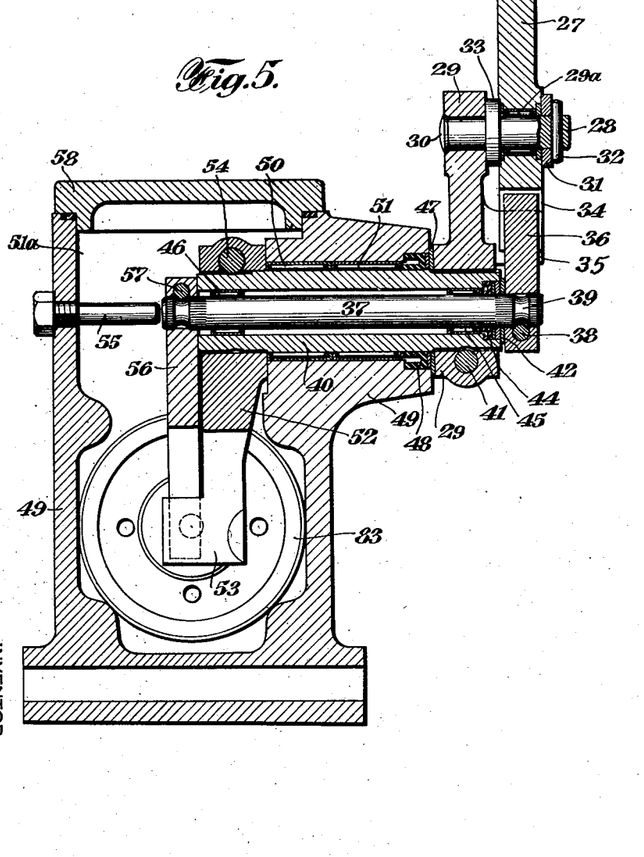
Fig. 5 is a transverse vertical section taken on line 5—5 of Fig. 3.

In order to control the operation of the part to be moved by the said monitor 1 I have provided a manually operable floating lever 27 which is carried on a pivot rod 28 passing through a lever 29 by a roller bearing 29a, beyond which lever the pivot rod 28 has a head 30, a washer 31 and cotter-pin 32 being located on the other end of said pivot rod 28. A washer 33 is located between the manual lever 27 and the lever 29. The lower end of the lever 27 has an arm 34, the movement of which is limited in one direction by a stop 35 on the lever 29. The movement of said arm 34 in the other direction is designed to operate a lever 36 located on a valve-operating shaft 37 on which it is held by a screw 38 passing within an annular recess 39 in said shaft 37. The said shaft 37 is supported for rotation within a sleeve 40 on which the lever 29 is located and held in place by a screw 41. A washer 42 is located between the lever 36 and the sleeve 40. It will be noted, also, that in order to limit the movement of the lever 36 towards the right in Fig. 4 there is provided a stop 43 on the lever 29. Also adjacent the lever 36 within the sleeve 40 there is a rubber seal 44 adjacent to roller bearings 45, similar roller bearings 46 being located also at the other end within the sleeve 40. The said sleeve 40 carries a washer 47 adjacent to the lever 29 and adjacent thereto there is provided a rubber seal 48 within a housing 49 having roller bearings 50 and 51 for supporting the sleeve 40 for rotation therein. The housing 49 has a chamber 51a into which the sleeve 40 extends and on which there is provided a reaction arm 52, having a rounded end 53, held in place by a screw 54. A screw 55 extends through the housing 49 to a point adjacent the inner end of the shaft 37 to retain the same in position as well as a valve lever 56, located on the inner end of the shaft 37 and held in place by a screw 57, which rests against the inner end of the sleeve 40. A cover plate 58 is located on the housing 49 and held in place by screws 59. The said housing 49, furthermore, has bolt holes 60 and 61 for attachment of the apparatus in any desired fixed position. Furthermore, the said housing has a screw plug 62 for normally closing a filler opening 63 and a relief valve to maintain a slight pressure in the system, having a casing 64, which is screw-threaded into the housing 49, having therein a check valve 65 seated by a spring 66 held in place by a spider 67 and a spring ring 68. The casing 64 is connected to the sump of a pump, which supplies the high pressure liquid to the pipe 100 hereinafter referred to, by a pipe 69. The valve lever 56 has a rounded lower end 70 which rests against a plunger 71 having a hemispherical end 72 which rests in a recess in the face of a valve member 73. The left face 74 of the valve member 73 acts as a valve seat forming a part of the exhaust valve, the other part of which is the right-hand end 75 of a tubular valve member 76. This right-hand end of the tubular valve member 76 has a flat annular portion 77 and a chamfered edge 78. Said tubular valve member 76, furthermore, has a tapered inlet valve surface 79 on its periphery slightly larger in diameter than the surface 77, at the point 80 where it seats on a valve seat member 81 located within a hollow plunger 82 which is slidably carried within a cylindrical servo device housing 83 attached to the side of the housing 49 in any desired manner. A liquid-tight seal 84 is located between the housing 49 and the cylindrical housing 83. The diameter at the point on the tapered valve 79 where it seats on the valve seat 80, thus, is slightly larger than the outside diameter of the surface 77 but said diameter at 80 is slightly smaller than the outside diameter of an inner end 85 of said tubular valve member 76. Furthermore, the said tubular valve member 76 has an annular recess 86 connecting with a series of ports 87 leading to a cylindrical passageway 88 in the tubular valve member and said annular passageway 86, when the valve 79, 80 is open, communicates with an annular passageway 88a provided in a spacing member 89 spaced from the valve seat member 81 by a rubber seal 90. Adjacent the spacing member 89 there is a ring 91 having a series of inlet ports 92 which communi-cate from the passageway 88a through passageways 93 and 94 to a series of inlet ports 95 leading to an annular chamber 96 in the periphery of the plunger 82, and which is sealed by two annular seals 97 and 98. The high pressure liquid enters the chamber 96 through a port 99 leading from a pipe 100. This high pressure liquid from the pipe 100 thus enters the longitudinal passageway 88 when the tubular valve member 76 is pushed manually by the valve lever 56, after closing the discharge valve 74, 75, said valve 74, 75 being normally opened by a small spring 101. However, the valve 79, 80 is normally kept closed by the force of a spring 102 seating at its righthand end on a shoulder 103 on the interior of the tubular valve member 76 and seated at its other end against a screw cap 104 in the plunger 82, said screw cap 104 having a plurality of passageways 105 to permit the passage of the modulated pressure liquid into a chamber 106 in the cylindrical housing 83. The said screw cap 104, at its extreme left position, rests against a tubular stop 107 in the cylindrical housing 83. This modulated pressure liquid may be conducted away to any part to be moved through a port 108 and thence to the flexible pipe 5. However, if desired, such modulated pressure liquid may be conveyed away through another port 110 as a dual connection and an air bleeder port 111 may be provided, which ports are closed by plugs 112 and 113, respectively. A drain plug 114 is also provided for draining the chamber 106, if desired. It will be noted that the high pressure fluid for the pipe 20 is always conveyed out of the side of the cylindrical casing 83 by a port 114a leading to the chamber 96 which is supplied by the pipe 100. When the valve 74, 75 is open the exhaust liquid passes through passageways 115 in the plunger 82 and thence into the interior of the housing 40 and from this point through the casing 64 and pipe 69 to the sump. A drain outlet opening 117 is also provided, which is normally closed by a plug 118. It will be understood that the high pressure liquid provided through the pipe 100 may be from any suitable source of supply of hydraulic pressure liquid maintained preferably at about 500 lbs. per square inch, and that the exhausted low pressure liquid passing out by the pipe 69 may, if desired, be returned after being placed under said high pressure and fed into the pipe 100. For this purpose any desired apparatus may be utilized, but by way of example I may utilize for this purpose the electrically-driven gear pump and accumulator disclosed in my patent upon Electroflow power supply system, No. 2,136,638, granted November 15, 1938.

Figure 3:
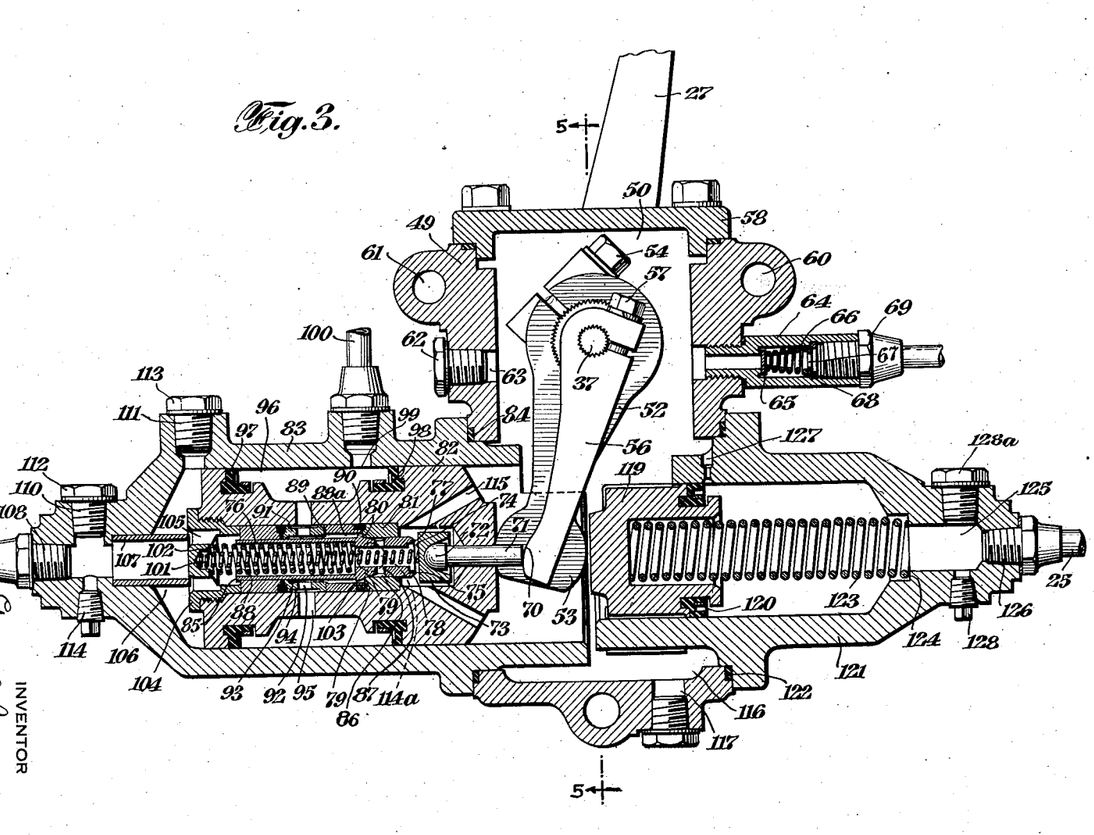
Fig. 3 is a longitudinal vertical section taken on line 3—3 of Fig. 2.

When the plunger 82 is then moved to the right, in Fig. 3, owing to the admission of the high pressure liquid to the chamber 106, which forces the plunger 82 to the right, the right face of said plunger 82 will move the lever 52 and consequently the lever 29 up to the point where the desired extent of travel of the part to be moved by the eye member 26 has been attained, it being understood that at any such particular point of travel any desired degree of pressure will be obtainable by the application of the manual modulated pressures due to the manual manipulation of the valves 74, 75 and 79, 80. This definite positioning of the piston rod 15 and the eye member 26 through the agency of the plunger 82, is accompanied by the lower rounded end 53 of the lever 52 contacting with the face of a piston 119 which is sealed by an annular seal 120 within a short cylinder 121 secured in any desired way to the housing 40 and sealed by means of a gasket 122. This piston 119 is moved to the left by means of a coil spring 123 seated against a shoulder 124 in said cylinder 121 around a passageway 125 having an outlet port 126 leading to the pipe 25. It will be noted that when the piston 119 is at the left end of its stroke the interior of the cylinder 121 communicates by a port 127 to the chamber within the housing 40 from which it receives the hydraulic fluid to compensate for any losses thereof in operating the monitor device through the pipe 25. Thus, when the lever 52 is moved to the right in Fig. 3, it coordinately moves the piston 119, trapping the liquid within the cylinder 121 and forcing the same out through the pipe 25. A drain plug 128 is provided on the cylinder 121 for draining the same when desired, and a plug 128a is provided for a dual connection.

Figure 1:
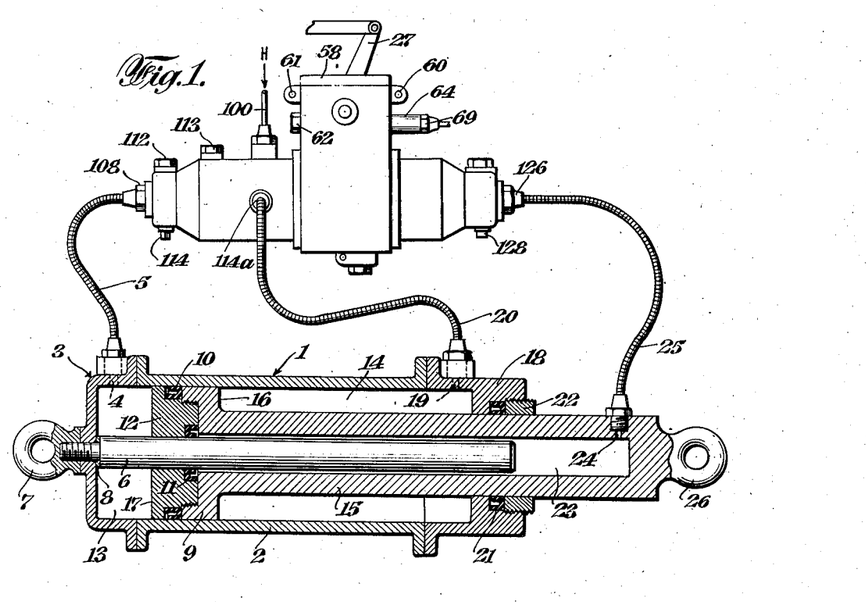
Fig. 1 is a diagrammatic representation of a system made in accordance with my invention.
Figure 2:
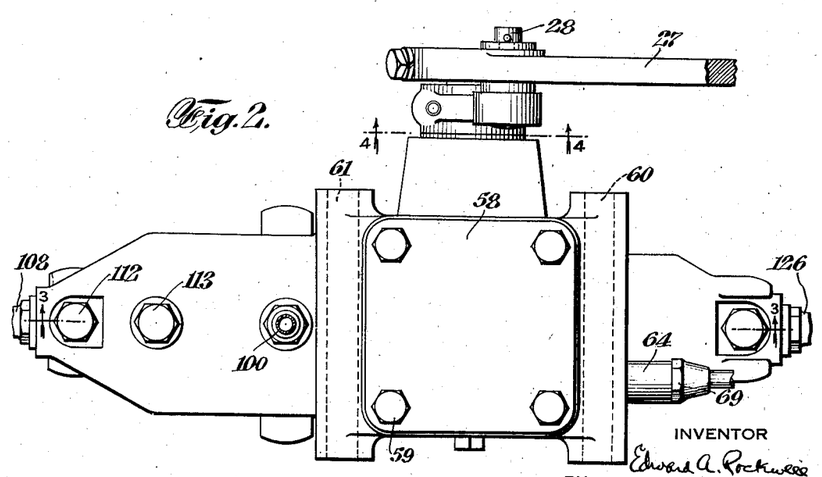
Fig. 2 is a plan view of the valve mechanism used for controlling the monitor device which in turn exerts the force supplied for operating the part to be moved in a forward or rearward direction.

In the operation of the apparatus it will be assumed that the eye member 7 has been secured to a fixed pivot and that the eye member 26 will be connected to any part to be moved, as for instance a valve or other device on which work is to be performed. When the manual lever 27 is moved towards the left the lever 36 will be moved thereby so as to in turn move the valve lever 56. As a result the valve 74, 75 will be closed and the valve 79, 80 will then be moved off its seat to admit high pressure liquid through the passageway 88 and pipe 5, resulting in the movement of the plunger 82 to the right with resultant movement of the lever 52 when the manual movement ceases, thus slightly shifting the pivot 28 and causing the lever 36 to be released slightly to close the valve 79, 80. At the same time there takes place a coordinate movement of the piston 119 and coordinate increase of resistance from the spring 123 with the resultant movement of the piston rod 15 and eye member 26 to the right, in Fig. 1, to the desired point by reason of the forcing of the liquid through the pipe 25 into the chamber 23 thus substantially coordinating the extent of movement of the eye 26 with the manual lever 27. At any such desired point to which the eye member 26 has been moved, however, the degree of pressure thereon can be modulatingly applied by a slight further movement of the manual lever 27 according to the extent to which it admits or exhausts increments of the pressure liquid through the valves 79, 80 and 74, 75 respectively. Therefore, the movement of means 82—53—29 to restore means 27—56 and the valve must follow the movement of 119, and consequently, the movement of means 15 relative to means 6. Of course, also, any position in the retraction of the eye member 26 corresponding substantially to the position of the manual lever 27 can be obtained, if desired, by a corresponding release of the pressure liquid through the valve 74, 75, it being understood that at any one release position of the manual lever 27 and the eye 26, the degree of modulated pressure desired to be used can be applied by a slight opening of the valve 79, 80 with automatic closing of said valve, as above, when the manual lever is held thereafter in a given position. By this means, at any point in the advance or retraction of the eye member 26 any desired degree of the modulated pressure may be manually applied thereto. This is accomplished partly by reason of the balancing of the forces due to the pressure liquid on the two sides of the piston 9, involving, also, the application of manual force to the piston 9 because of the levers 27 and 52 and plunger 82. The right face 16 thereof receives the full force of the high pressure but only on an area which is one half the size of the area 17 and, accordingly, by changing the pressure in the chamber 13 so as to obtain a force greater or less than the force exerted by the liquid in the chamber 14, the desired degrees of pressure exerted either in the advance or retraction of the eye member 26 can be obtained, while at all times the positioning of the eye member 26 has been secured by controlling the entry or exit of the liquid into or out of the chamber 23. When the manual lever 27 is entirely released the parts will return to their original positions, the released liquid passing by the valve 74, 75 and the pipe 69 to the sump of the pump to be again supplied under pressure to the pipe 100. It will be noted, furthermore, that these various purposes are secured merely by the single valve device. Furthermore, these operations are secured with the utmost accuracy and positiveness of action. In case of failure of the power pressure on the hydraulic fluid, of course, manual operation of the eye member 26 towards the right, in Fig. 1, can be had by moving the hand lever 27 to the left, in Figs. 1 and 4, thus moving the lever 36 to the right, in Fig. 4, and ultimately against the stop 43, in Fig. 4, so as to move the piston 119 to the right, in Fig. 1. Thus, in case of power failure, the lever system 27—52—56 all moves together to move the piston 119 to the right, in Fig. 1, and to create pressure in the chamber 23 to move the means 26. When, thereafter, the manual pressure is released the piston 119 is returned to the left, in Fig. 3, by the spring 123, thus returning the piston 12 to the left, in Fig. 1, owing to the suction created in the chamber 23, the valve 74, 75 being open to permit the access of liquid to the chamber 13 during this retraction movement of the piston 119.

It will be understood, of course, that any gaseous fluid may be used in place of the hydraulic liquid herein although not so advantageously as where hydraulic liquid is used.

While I have described my invention above in detail I wish it to be understood that many changes may be made therein without departing from the spirit of the same.

I claim:

1. In combination, a source of pressure fluid, a work-performing element adapted to be moved thereby, a control means therefor, a valve device controlled by said means having a valve mechanism provided with ports adapted to admit and discharge the pressure fluid for moving said element in one direction, a conduit substantially constantly provided with said pressure fluid for urging said element in the opposite direction, means for producing an increasing resistance to the control movement of said control means for moving the element in said one direction, a fluid actuated position-coordinating motor having a differential piston connected on one side thereof to said conduit and having a pressure fluid connection from the other side thereof to said valve mechanism, and a plunger in a cylinder connected to move coordinately with the control means, said cylinder having a pressure fluid connection, means forming a variable volume chamber connected to the pressure fluid connection, means connecting said variable volume chamber and work element for movement in order to vary the volume of the chamber and thereby cause a coordinate movement of the control means and said element, said last mentioned pressure fluid connection having a normally closed means to provide self phasing of the differential piston and the control means by opening the same for the replenishment of fluid in the retracted position of the last mentioned plunger.

2. In combination, a source of pressure fluid, a work-performing element adapted to be moved thereby, a control means therefor, a valve device controlled by said means having a valve mechanism provided with ports adapted to admit and discharge the pressure fluid for moving said element in one direction, a conduit under substantially uniform constant pressure provided with said pressure fluid for urging said element in the opposite direction, means for producing an increasing resistance to the control movement of said control means for moving the element in said one direction, a pressure fluid actuated position-coordinating motor having a differential piston connected on one side thereof to said conduit and having a pressure fluid connection from the other side side thereof to said valve mechanism, and a plunger in a cylinder having a pressure fluid connection, means forming a variable volume chamber connected to the pressure fluid means and connection, means connecting said variable volume chamber means and work element for movement in order to vary the volume of the chamber and thereby cause a coordinate movement of the control means and said element, said last mentioned pressure fluid connection having a normally closed means to provide self phasing of the differential piston and the control means by opening the same for the replenishment of fluid in the retracted position of the last mentioned plunger, and said variable volume chamber means including a chamber in said piston.

3. In combination, a source of pressure fluid, a work-performing element adapted to be moved thereby, a control means therefor, a valve device controlled by said means having a valve mechanism provided with ports adapted to admit and discharge the pressure fluid for moving said element in one direction, a plunger responsive to the pressure admitted by the valve device, in which the valve is carried, a conduit provided with said source of pressure fluid for urging said element in the opposite direction, a fluid actuated position-coordinating motor having a differential piston connected on one side thereof to said conduit and having a pressure fluid connection from the other side thereof to said valve mechanism, and a plunger in a cylinder connected to move coordinately with the control means, said cylinder having a pressure fluid connection, means forming a variable chamber connected to the pressure fluid connection, means connecting said variable volume chamber and work element for movement in order to vary the volume of the chamber and thereby cause a coordinate movement of the control means and said element, said last mentioned connection having a normally closed means to provide self phasing of the differential piston and the control means by opening the same for replenishment of fluid in the retracted position of the last mentioned plunger.

4. In combination, a source of pressure fluid, a work-performing element adapted to be moved thereby, a control means therefor, a valve device controlled by said means having valve mechanism provided with ports adapted to admit and discharge the pressure fluid for moving said element in one direction, a plunger responsive to pressure admitted by the valve device in which the valve is carried, a conduit, under substantially constant pressure, connected to said source of pressure fluid for urging said element in the opposite direction, a pressure fluid actuated position-coordinating motor having a differential piston connected on one side thereof to said conduit and having a pressure fluid connection from the other side thereof to said valve mechanism, and a plunger in a cylinder connected to move coordinately with the control means, said cylinder having a pressure fluid connection, means forming a variable volume chamber connected to the pressure fluid connection, means connecting said variable volume chamber means and work element for movement in order to vary the volume of the chamber and thereby cause a coordinate movement of the control means and said element, said last mentioned pressure fluid connection having a normally closed means to provide self phasing of the differential piston and the control means by opening the same for the replenishment of fluid in the retracted position of the last mentioned plunger, said variable volume chamber means including a chamber in said piston.

5. In combination, a source of pressure fluid, a work-performing element adapted to be moved thereby, a control means therefor, a valve device controlled by said means having valve mechanism provided with ports adapted to admit and discharge the pressure fluid for moving said element in one direction, a plunger responsive to pressure admitted by the valve device in which the valve is carried, a conduit provided with said pressure fluid for urging said element in the opposite direction, a fluid actuated position-coordinating motor having a differential piston connected on one side thereof to said conduit and having a pressure fluid connection from the other side thereof to said valve mechanism, and a plunger in a cylinder connected to move coordinately with the control means, said cylinder having a pressure fluid connection, means forming a variable volume chamber connected to the pressure fluid connection, means connecting said variable volume chamber and work element for movement in order to vary the volume of the chamber and thereby cause a coordinate movement of the control means and said element, said control means comprising a manual lever, a lever arm operated thereby for operating said valve, and a lever operated by said first mentioned plunger on which the manual lever is pivoted.

6. In combination, a source of pressure fluid, a work-performing element adapted to be moved thereby, a control means therefor, a valve device controlled by said means having valve mechanism provided with ports adapted to admit and discharge the pressure fluid for moving said element in one direction, a plunger responsive to pressure admitted by the valve device in which the valve is carried, a conduit, under substantially constant pressure, connected to said source of pressure fluid for urging said element in the opposite direction, a pressure fluid actuated position-coordinating motor having a differential piston connected on one side thereof to said conduit and having a pressure fluid connection from the other side thereof to said valve mechanism, and a plunger in a cylinder connected to move coordinately with the control means, said cylinder having a pressure fluid connection, means forming a variable volume chamber connected to the pressure fluid connection, means connecting said variable volume chamber means and work element for movement in order to vary the volume of the chamber and thereby cause a coordinate movement of the control means and said element, said variable volume chamber means including a chamber in said piston, said control means comprising a manual lever, a lever arm operated thereby for operating said valve, and a lever operated by said first mentioned plunger on which the manual lever is pivoted.

7. In combination, a source of pressure fluid, a work-performing element adapted to be moved thereby, a control means therefor, a valve device controlled by said means having valve mechanism provided with ports adapted to admit and discharge the pressure fluid for moving said element in one direction, a plunger responsive to pressure admitted by the valve device in which the valve is carried, a conduit provided with said source of pressure fluid for urging said element in the opposite direction, a pressure fluid actuated position-coordinating motor having a differential piston connected on one side thereof to said conduit and having a pressure fluid connection from the other side thereof to said valve mechanism, and a plunger in a cylinder connected to move coordinately with the control means, said cylinder having a pressure fluid connection, means forming a variable volume chamber connected to the pressure fluid connection, means connecting said variable volume chamber and work element for movement in order to vary the volume of the chamber and thereby cause coordinate movement of the control means and said element, said control means comprising a manual lever, a lever arm operated thereby for operating said valve and a lever operated by said first mentioned plunger on which the manual lever is pivoted, and a spring adapted to retract the second mentioned plunger.

8. In combination, a source of pressure fluid, a work-performing element adapted to be moved thereby, a control means therefor, a valve device controlled by said means having valve mechanism provided with ports adapted to admit and discharge the pressure fluid for moving said element in one direction, a plunger responsive to pressure admitted by the valve device in which the valve is carried, a conduit, under substantially constant pressure, connected to said source of pressure fluid for urging said element in the opposite direction, a pressure fluid actuated position-coordinating motor having a differential piston connected on one side thereof to said conduit and having a pressure fluid connection from the other side thereof to said valve mechanism, and a plunger in a cylinder connected to move coordinately with the control means, said cylinder having a pressure fluid connection, means forming a variable volume chamber connected to the pressure fluid connection, means connecting said variable volume chamber means and work element for movement in order to vary the volume of the chamber and thereby cause coordinate movement of the control means and said element, said variable volume chamber means including a chamber in said piston, said control means comprising a manual lever, a lever arm operated thereby for operating said valve and a lever operated by said first mentioned plunger on which the manual lever is pivoted, and a spring adapted to retract the second mentioned plunger.

9. In combination, a source of liquid under pressure, a motor provided with a cylinder as well as a piston having opposed areas of different size adapted to be moved in opposite directions by liquid under pressure for the performance of work, a hydraulic connection from the source of pressure liquid to one side of the motor piston to move the latter, a manual control means for controlling the movement of said piston with pressure liquid and pressure means for acting against the other side of said piston said pressure means including a cylinder having a plunger carrying a valve for the passage of said liquid, said plunger and valve being operatively connected with the control means to be moved as a result of the operation of said control means and a cylinder having a plunger element operatively connected to said piston and operated by said first mentioned plunger and having a position-coordinating hydraulic means including a cylinder and plunger adapted to maintain synchronism of the control means and the piston including a connection to said piston adapted to be opened for the replenishment of liquid in the retracted position of the first mentioned plunger.

10. In combination, a source of liquid under pressure, a motor provided wtih a cylinder as well as a piston having opposed areas of different size adapted to be moved in opposite directions by liquid under pressure for the performance of work, a hydraulic connection from the source of pressure liquid to one side of the motor piston to move the latter, a manual control means for controlling the movement of said piston with pressure liquid and pressure means for acting against the other side of said piston said pressure means including a cylinder having a plunger carrying a valve for the passage of said liquid, said plunger and valve being operatively connected with the control means to be moved as a result of the operation of said control means and a cylinder having a plunger element operatively connected to said piston and operated by said first mentioned plunger and having a position-coordinating hydraulic means including a cylinder and plunger adapted to maintain synchronism of the control means and the piston including a connection to said piston adapted to be opened for the replenishment of liquid in the retracted position of the first mentioned plunger, the smaller of said areas being constantly subjected to the pressure of said liquid.

11. In combination, a source of liquid under pressure, a motor provided with a cylinder as well as a piston having opposed areas of different size adapted to be moved in opposite directions by liquid under pressure for the performance of work, a hydraulic connection from the source of pressure liquid to one side of the motor piston to move the latter, a manual control means for controlling the movement of said piston with pressure liquid and pressure means for acting against the other side of said piston said pressure means including a cylinder having a plunger carrying a valve for the passage of said liquid, said plunger and valve being operatively connected with the control means to be moved as a result of the operation of said control means and a cylinder having a plunger element operatively connected to said piston and operated by said first mentioned plunger and having a position-coordinating hydraulic means including a cylinder and plunger adapted to maintain synchronism of the control means and the piston including a connection to said piston adapted to be opened for the replenishment of liquid in the retracted position of the first mentioned plunger, the smaller of said areas being constantly subjected to the pressure of said liquid and the other area being adapted to receive the liquid from said valve.

12. In combination, a source of pressure fluid, a work-performing element adapted to be moved thereby, a control means therefor, a valve device controlled by said means having a valve mechanism provided with ports adapted to admit and discharge the pressure fluid for moving said element in one direction, a conduit provided with said source of pressure fluid for urging said element in the opposite direction, a fluid actuated position-coordinating motor having a differential piston connected on one side thereof to said conduit and having a pressure fluid connection from the other side thereof to said valve mechanism, a cylinder for said differential piston, and a plunger in a cylinder, connected to move coordinately with the control means, said cylinder having a pressure fluid connection, means forming a variable volume chamber connected to the pressure fluid connection, means connecting said variable volume chamber and differential piston enclosed in the motor for movement in order to vary the volume of the chamber and thereby cause a coordinate movement of the control means and said element, said last mentioned connection having a normally closed means to provide self phasing of the differential piston and the control means by opening the same for replenishment of fluid in the retracted position of the last mentioned plunger.

13. In combination, a source of pressure fluid, a work-performing element adapted to be moved thereby, a control means therefor comprising means to apply a manual force to the work-performing element, a valve device controlled by said means having a valve mechanism provided with ports adapted to admit and discharge the pressure fluid for moving said element in one direction, a conduit provided with said source of pressure fluid for urging said element in the opposite direction, a fluid actuated position-coordinating motor having a differential piston booster for the manual force connected on one side thereof to said conduit and having a pressure fluid connection from the other side thereof to said valve mechanism, a cylinder for said differential piston, and a plunger in a cylinder, connected to move coordinately with the control means, said cylinder having a pressure fluid connection, means forming a variable volume chamber connected to the pressure fluid connection, means connecting said variable volume chamber and differential piston enclosed in the motor for movement in order to vary the volume of the chamber and thereby cause a coordinate movement of the control means and said element, said last mentioned connection having a normally closed means to provide self phasing of the differential piston and the control means by opening the same for replenishment of fluid in the retracted position of the last mentioned plunger.

14. In combination, a source of pressure fluid, a work-performing element adapted to be moved thereby, a control means therefor comprising means to apply a manual force to the work-performing element, a valve device controlled by said means having a valve mechanism provided with ports adapted to admit and discharge the pressure fluid for moving said element in one direction, a conduit provided with said source of pressure fluid for urging said element in the opposite direction, a fluid actuated position-coordinating motor having a differential piston booster for the manual force connected on one side thereof to said conduit and having a pressure fluid connection from the other side thereof to said valve mechanism, a cylinder for said differential piston, and a plunger, connected to the differential piston in a cylinder, connected to move coordinately with the control means, said cylinder having a pressure fluid connection, means forming a variable volume chamber connected to the pressure fluid connection, means connecting said variable volume chamber and differential piston enclosed in the motor for movement in order to vary the volume of the chamber and thereby cause a coordinate movement of the control means and said element, said last mentioned connection having a normally closed means to provide self phasing of the differential piston and the control means by opening the same for replenishment of fluid in the retracted position of the last mentioned plunger.

15. In combination, a source of pressure fluid, a work-performing element adapted to be moved thereby, a control means therefor, a modulating valve device controlled by said means having a valve mechanism provided with ports adapted to admit and discharge the pressure fluid for moving said element in one direction, a conduit provided with said source of pressure fluid for urging said element in the opposite direction, a fluid actuated position-coordinating motor having a piston connected on one portion thereof to said conduit and having a pressure fluid connection from another portion thereof to said valve mechanism, a cylinder for said differential piston, and a plunger arranged to follow the movement of the piston in a cylinder, connected to move coordinately with the control means, said cylinder having a pressure fluid connection, means forming a variable volume chamber connected to the pressure fluid connection and means connecting said variable volume chamber and differential piston enclosed in the motor for movement in order to vary the volume of the chamber and thereby cause a coordinate movement of the control means and said element, said last mentioned connection having a normally closed means to provide self phasing of the piston and the contorl means by opening the same for replenishment of fluid in the retracted position of the last mentioned plunger.

16. In combination, a source of pressure fluid, a work-performing element adapted to be moved thereby, a control means therefor comprising means to apply a manual force to the work-performing element, a valve device controlled by said means having a valve mechanism provided with ports adapted to admit and discharge the pressure fluid for moving said element in one direction, a conduit provided with said source of pressure fluid for urging said element in the opposite direction, a fluid actuated position-coordinating motor having a differential piston booster for the manual force connected on one side thereof to said conduit and having a pressure fluid connection from the other side thereof to said valve mechanism, a cylinder for said differential piston, and a plunger in a cylinder, connected to move coordinately with the control means and constructed to receive boosting pressure from the differential piston for work performance, said cylinder having a pressure fluid connection, means forming a variable volume chamber connected to the pressure fluid connection, and means connecting said variable volume chamber and differential piston enclosed in the motor for movement in order to vary the volume of the chamber and thereby cause a coordinate movement of the control means and said element, said last mentioned connection having a normally closed means to provide self phasing of the differential piston and the control means by opening the same for replenishment of fluid in the retracted position of the last mentioned plunger.

17. In combination, a source of pressure fluid, a work-performing element adapted to be moved thereby, a control means therefor, a valve device controlled by said means having a valve mechanism provided with ports adapted to admit and discharge the pressure fluid for moving said element in one direction, a plunger responsive to the pressure admitted by the valve device, in which the valve is carried, a conduit provided with said source of pressure fluid for urging said element in the opposite direction, a fluid actuated position-coordinating motor having a differential piston connected on one side thereof to said conduit and having a pressure fluid connection from the other side thereof to said valve mechanism, and a second plunger in a cylinder connected to move coordinately with the control means, said cylinder having a pressure fluid connection, means forming a variable chamber connected to the pressure fluid connection, and means connecting said variable volume chamber and work element for movement in order to vary the volume of the chamber and thereby cause a coordinate movement of the control means and said element, said last mentioned connection having a normally closed means, containing the second plunger connected to said first mentioned plunger, to provide self phasing of the differential piston and the control means by opening the same for replenishment of fluid in the retracted position of the last mentioned plunger.

18. In combination, a source of pressure fluid, a work-performing element adapted to be moved thereby, a control means therefor, a valve device controlled by said means having a valve mechanism provided with ports adapted to admit and discharge the pressure fluid for moving said element in one direction, a conduit provided with said source of pressure fluid for urging said element in the opposite direction, a fluid actuated position-coordinating motor having a differential piston connected to said conduit and having a pressure fluid connection to said valve mechanism, a cylinder for said differential piston, and a plunger in a cylinder connected to move coordinately with the control means, said cylinder having a pressure fluid connection, means forming a variable volume chamber connected to the pressure fluid connection, and means connecting said variable volume chamber and differential piston enclosed in the motor for movement in order to vary the volume of the chamber and thereby cause a coordinate movement of the control means and said element, said last mentioned connection having a normally closed means to provide self phasing of the differential piston and the control means by opening the same for replenishing of fluid in the retracted position of the plunger.

19. A liquid power booster comprising, means for applying a pressure liquid thereto, a movable control means, including a cylinder, a plunger and a valve member, for controlling the application of power thereto, so as to produce a volume displacement of the pressure liquid according to the movement applied to the control means, a first servo device adapted to be controlled to accord with said displacement of the pressure liquid and to accord with the pressure exerted to move the control means, another servo device connected to the first servo device adapted to be controlled merely by the pressure of the pressure liquid applied in the power booster, and means, connected to said plunger, controlled by the movement of the control means for thus controlling the application of pressure liquid to said other servo device.

20. A liquid power booster comprising, means for applying a pressure liquid thereto, a movable control means, including a cylinder, a plunger and a valve member, for controlling the application of power thereto, so as to produce a volume displacement of the pressure liquid according to the movement applied to the control means, a first servo device adapted to be controlled to accord with said displacement of the pressure liquid and to accord with the pressure exerted to move the control means, another servo device connected to the first servo device adapted to be controlled merely by the pressure of the pressure liquid applied in the power booster, means, connected to said plunger, controlled by the movement of the control means for thus controlling the application of pressure liquid to said other servo device, and a connection for supplying the pressure liquid to said servo devices in opposition to their movement by said previously mentioned liquid pressures.

21. A liquid power booster comprising, means for applying a pressure liquid thereto, a movable control means, including a cylinder, a plunger and a valve member, for controlling the application of power thereto, said control means being provided with a master cylinder so as to produce a volume displacement of the pressure liquid according to the movement applied to the control means, a first servo device adapted to be controlled to accord with said displacement of the pressure liquid and to accord with the pressure exerted to move the control means, and another servo device connected to the first servo device adapted to be controlled merely by the pressure of the pressure liquid applied in the power booster, said cylinder having means, connected to said plunger, controlled by the movement of the control means for thus controlling the application of pressure liquid to said other servo device.

22. A liquid power booster comprising, means for applying a pressure liquid thereto, a movable control means, including a cylinder, a plunger and a valve member, for controlling the application of power thereto, said control means being provided with a master cylinder so as to produce a volume displacement of the pressure liquid according to the movement applied to the control means, a first servo device adapted to be controlled to accord with said displacement of the pressure liquid and to accord with the pressure exerted to move the control means, another servo device connected to the first servo device adapted to be controlled merely by the pressure of the pressure liquid applied in the power booster, said master cylinder having means, connected to said plunger, controlled by the movement of the control means for thus controlling the application of pressure liquid to said other servo device, and a connection for supplying the pressure liquid to said servo devices in opposition to their movement by said previously mentioned liquid pressures.

23. In combination, a hydraulic master cylinder and piston, a hydraulic power cylinder and piston, means connecting said pistons for joint movement, a source of hydraulic pressure fluid for actuating the hydraulic power cylinder and piston, means for controlling the hydraulic pressure fluid, including a valve and an actuating member therefor having a follow-up connection with the power piston, a power applying cylinder and a differential piston therefor, a monitor comprising a cylinder and piston having a capacity in the actuation of same substantially equal to the displaceable volume of the said master cylinder and piston, the said differential piston and monitor being connected together, a hydraulic connection from the power cylinder to the power applying cylinder in communication with one side of the differential piston, a hydraulic connection from the said source of pressure to the other side of said differential piston, and a hydraulic connection from the master cylinder to the monitor so that the power piston, master piston and differential piston and monitor move together coordinately with the travel of the actuating member.

EDWARD A. ROCKWELL.